US012165638B2

(12) United States Patent
Velikovich et al.

(10) Patent No.: US 12,165,638 B2
(45) Date of Patent: Dec. 10, 2024

(54) PERSONALIZABLE PROBABILISTIC MODELS

(71) Applicant: Google LLC, Mountain View, CA (US)

(72) Inventors: Leonid Aleksandrovich Velikovich, New York, NY (US); Petar Stanisa Aleksic, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 17/659,330

(22) Filed: Apr. 14, 2022

(65) Prior Publication Data

US 2023/0335125 A1    Oct. 19, 2023

(51) Int. Cl.
*G10L 15/197* (2013.01)
*G06F 40/166* (2020.01)
*G06F 40/284* (2020.01)
*G06F 40/295* (2020.01)
*G10L 15/06* (2013.01)
(Continued)

(52) U.S. Cl.
CPC .......... *G10L 15/197* (2013.01); *G06F 40/166* (2020.01); *G06F 40/284* (2020.01); *G06F 40/295* (2020.01); *G10L 15/063* (2013.01); *G10L 15/22* (2013.01); *G10L 15/32* (2013.01); *G10L 2015/228* (2013.01)

(58) Field of Classification Search
CPC ..... G10L 15/197; G10L 15/063; G10L 15/22; G10L 15/32; G10L 2015/228; G10L 15/1815; G06F 40/166; G06F 40/284; G06F 40/295
See application file for complete search history.

(56) References Cited

U.S. PATENT DOCUMENTS 8,862,467 B1 * 10/2014 Casado ................... G10L 15/22
                                                         704/235
9,934,777 B1 *  4/2018 Joseph .................... G10L 15/22
(Continued)

OTHER PUBLICATIONS

International Search Report and Written Opinion for the related Application No. PCT/US2023/018484 dated Jun. 16, 2023, 56 pages.

*Primary Examiner* — Pierre Louis Desir
*Assistant Examiner* — Keisha Y. Castillo-Torres
(74) *Attorney, Agent, or Firm* — Honigman LLP; Brett A. Krueger; Grant Griffith

(57) ABSTRACT

A method includes receiving audio data corresponding to an utterance spoken by a user and processing, using a first recognition model, the audio data to generate a non-contextual candidate hypothesis as output from the first recognition model. The non-contextual candidate hypothesis has a corresponding likelihood score assigned by the first recognition model. The method also includes generating, using a second recognition model configured to receive personal context information, a contextual candidate hypothesis that includes a personal named entity. The method also includes scoring, based on the personal context information and the corresponding likelihood score assigned to the non-contextual candidate hypothesis, the contextual candidate hypothesis relative to the non-contextual candidate hypotheses. Based on the scoring of the contextual candidate hypothesis relative to the non-contextual candidate hypothesis, the method also includes generating a transcription of the utterance by selecting one of the contextual candidate hypothesis or the non-contextual candidate hypothesis.

18 Claims, 6 Drawing Sheets

(51) Int. Cl.
 *G10L 15/22* (2006.01)
 *G10L 15/32* (2013.01)

(56) References Cited

U.S. PATENT DOCUMENTS

| | | | |
|---|---|---|---|
| 2006/0178886 A1 | 8/2006 | Braho et al. | |
| 2007/0239637 A1 | 10/2007 | Paek et al. | |
| 2010/0145694 A1 | 6/2010 | Ju et al. | |
| 2015/0279360 A1 | 10/2015 | Mengibar et al. | |
| 2017/0092264 A1* | 3/2017 | Hakkani-Tur | G10L 15/16 |
| 2018/0190288 A1 | 7/2018 | Thomson et al. | |
| 2020/0349922 A1* | 11/2020 | Peyser | G06N 3/044 |
| 2020/0357388 A1* | 11/2020 | Zhao | G06F 18/2113 |

* cited by examiner

PERSONALIZABLE PROBABILISTIC MODELS

TECHNICAL FIELD

This disclosure relates to personalizable probabilistic models.

BACKGROUND

Modern automatic speech recognition (ASR) systems focus on providing not only quality/accuracy (e.g., low word error rates (WERs)), but also low latency (e.g., a short delay between the user speaking and a transcription appearing). Due to sparsity in generalized training data used to train ASR systems in performing speech recognition tasks, ASR systems have difficulty recognizing specialized phrases that include medical/legal terminology, and proper nouns such as personal contacts, song/artist names, applications, and emergence of new entity names. By the same notion, ASR systems have difficulty recognizing terms in cross-lingual utterances that are in a language different than a language of the training data. As a result, speech recognition lattices either rank these specialized phrases low or omit the specialized phrases entirely.

SUMMARY

One aspect of the disclosure provides a method for scoring a contextual candidate hypothesis relative to a non-contextual candidate hypothesis that, when executed data processing hardware, causes the data processing hardware to perform operations. The operations include receiving audio data corresponding to an utterance spoken by a user, and processing, using a first recognition model, the audio data to generate a non-contextual candidate hypothesis as output from the first recognition model. Here, the non-contextual candidate hypothesis corresponds to a candidate transcription of the utterance and has a corresponding likelihood score assigned by the first recognition model to the non-contextual candidate hypothesis. The operations also include generating, using a second recognition model configured to receive personal context information, a contextual candidate hypothesis that includes a personal named entity. Here, the contextual candidate hypothesis corresponds to another candidate transcription for the utterance. The operations further include scoring, based on the personal context information and the corresponding likelihood score assigned to the non-contextual candidate hypothesis, the contextual candidate hypothesis relative to the non-contextual candidate hypotheses, and based on the scoring of the contextual candidate hypothesis relative to the non-contextual candidate hypothesis, generating a transcription of the utterance spoken by the user by selecting one of the contextual candidate hypothesis or the non-contextual candidate hypothesis.

Implementations of the disclosure may include one or more of the following optional features. In some implementations, the first recognition model processes the audio data to generate the non-contextual candidate hypothesis without incorporating any of the personal contextual information associated with the user. In some examples, the first recognition model includes an end-to-end speech recognition model configured to generate the corresponding likelihood score for the non-contextual candidate hypothesis.

In some implementations, the second recognition model includes an end-to-end speech recognition model configured to generate the contextual candidate hypothesis. Here, generating the contextual candidate hypothesis that includes the personal named entity includes processing, using the end-to-end speech recognition model, the audio data to generate the contextual candidate hypothesis based on the personal context information. In these implementations, the end-to-end speech recognition model may be configured to generate the contextual candidate hypothesis after the non-contextual candidate hypothesis is generated as output from the first recognition model. Alternatively, the end-to-end speech recognition model is configured to generate the contextual candidate hypothesis in parallel with the processing of the audio data to generate the non-contextual candidate hypothesis as output from first recognition model.

In some examples, the second recognition model includes a language model. In some implementations, the personal context information associated with the user includes personal named entities specific to the user. Here, the personal named entities includes at least one of contact names in a personal contact list of the user, names in in a media library associated with the user, names of installed applications, names of nearby locations, or user-defined entity names. In some examples, the personal context information associated with the user further indicates a user history related to the personal named entities specific to the user.

In some implementations, the operations also include receiving a training corpus of ground-truth transcriptions. For each corresponding ground-truth transcription in the training corpus of ground-truth transcriptions, the operations also include determining whether a personal named entities is identified in the corresponding ground-truth transcription, and, when the personal named entity is identified in the corresponding ground-truth transcription, replacing the personal named entity with an entity class token. Here, the operations further include training the first recognition model on the ground-truth transcriptions that include personal named entities replaced by the entity class tokens.

Another aspect of the disclosure provides a system for scoring a contextual candidate hypothesis relative to a non-contextual candidate hypothesis. The system includes data processing hardware and memory hardware in communication with the data processing hardware. The memory hardware stores instructions that when executed on the data processing hardware cause the date processing hardware to perform operations including receiving audio data corresponding to an utterance spoken by a user, and processing, using a first recognition model, the audio data to generate a non-contextual candidate hypothesis as output from the first recognition model. Here, the non-contextual candidate hypothesis corresponds to a candidate transcription of the utterance and has a corresponding likelihood score assigned by the first recognition model to the non-contextual candidate hypothesis. The operations also include generating, using a second recognition model configured to receive personal context information, a contextual candidate hypothesis that includes a personal named entity. Here, the contextual candidate hypothesis corresponds to another candidate transcription for the utterance. The operations further include scoring, based on the personal context information and the corresponding likelihood score assigned to the non-contextual candidate hypothesis, the contextual candidate hypothesis relative to the non-contextual candidate hypotheses, and based on the scoring of the contextual candidate hypothesis relative to the non-contextual candidate hypothesis, generating a transcription of the utterance spoken by the user by selecting one of the contextual candidate hypothesis or the non-contextual candidate hypothesis.

This aspect may include one or more of the following optional features. In some implementations, the first recognition model processes the audio data to generate the non-contextual candidate hypothesis without incorporating any of the personal contextual information associated with the user. In some examples, the first recognition model includes an end-to-end speech recognition model configured to generate the corresponding likelihood score for the non-contextual candidate hypothesis.

In some implementations, the second recognition model includes an end-to-end speech recognition model configured to generate the contextual candidate hypothesis. Here, generating the contextual candidate hypothesis that includes the personal named entity includes processing, using the end-to-end speech recognition model, the audio data to generate the contextual candidate hypothesis based on the personal context information. In these implementations, the end-to-end speech recognition model may be configured to generate the contextual candidate hypothesis after the non-contextual candidate hypothesis is generated as output from the first recognition model. Alternatively, the end-to-end speech recognition model is configured to generate the contextual candidate hypothesis in parallel with the processing of the audio data to generate the non-contextual candidate hypothesis as output from first recognition model.

In some examples, the second recognition model includes a language model. In some implementations, the personal context information associated with the user includes personal named entities specific to the user. Here, the personal named entities includes at least one of contact names in a personal contact list of the user, names in in a media library associated with the user, names of installed applications, names of nearby locations, or user-defined entity names. In some examples, the personal context information associated with the user further indicates a user history related to the personal named entities specific to the user.

In some implementations, the operations also include receiving a training corpus of ground-truth transcriptions. For each corresponding ground-truth transcription in the training corpus of ground-truth transcriptions, the operations also include determining whether a personal named entities is identified in the corresponding ground-truth transcription, and, when the personal named entity is identified in the corresponding ground-truth transcription, replacing the personal named entity with an entity class token Here, the operations further include training the first recognition model on the ground-truth transcriptions that include personal named entities replaced by the entity class tokens.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
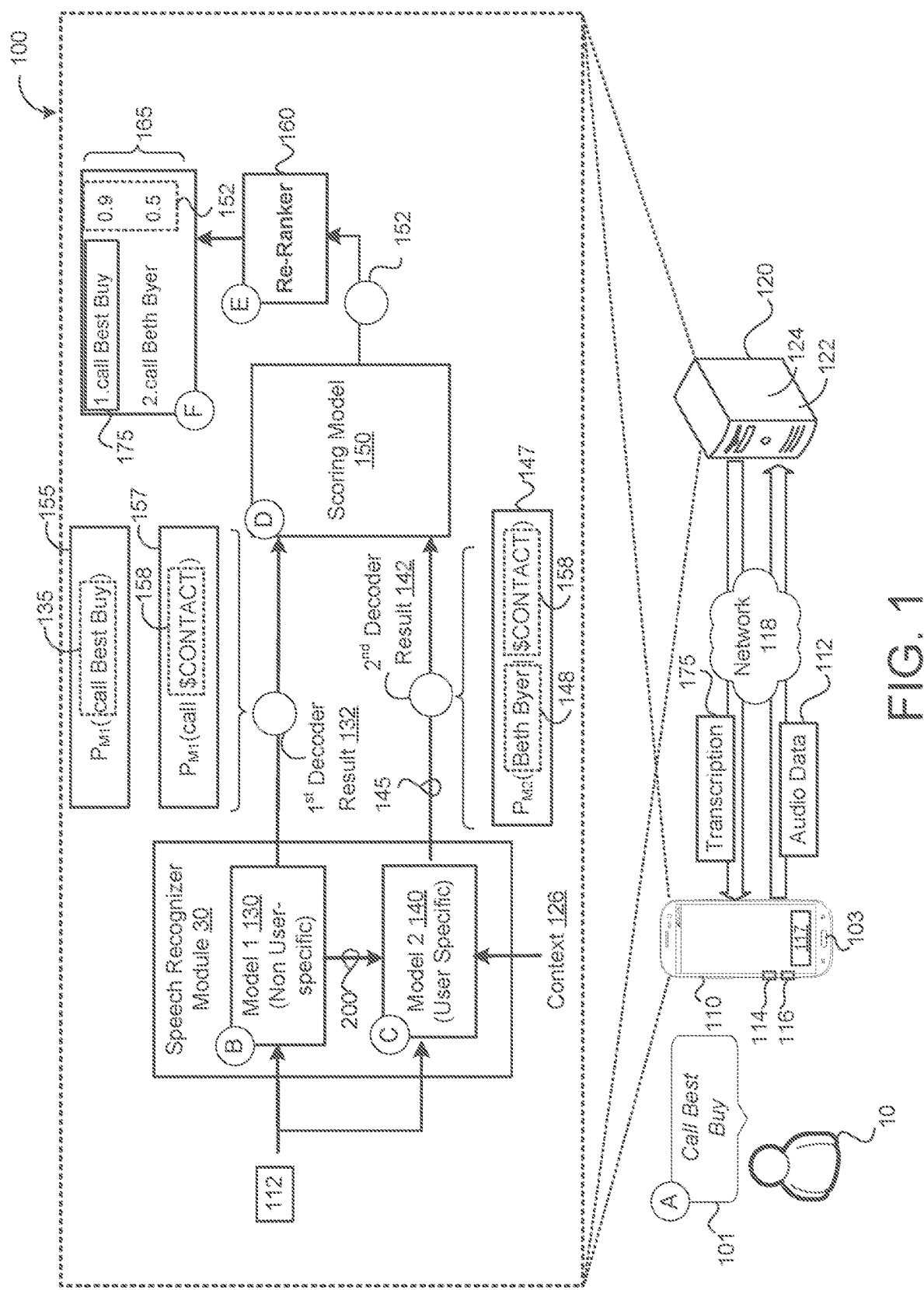
FIG. 1 is an example system for scoring a first candidate hypothesis generated for an utterance by a first recognizer model and a second candidate hypothesis generated for the same utterance by a second recognizer model.

Automatic speech recognition (ASR) systems are becoming increasingly popular in client devices as the ASR systems continue to provide more accurate transcriptions of what users speak. Recently, end-to-end (E2E) ASR models have gained popularity in achieving state-of-the-art performance in accuracy and latency. In contrast to conventional hybrid ASR systems that include separate acoustic, pronunciation, and language models, E2E ASR models apply a sequence-to-sequence approach to jointly learn acoustic and language modeling in a single neural network that is trained end to end from training data, e.g., utterance-transcription pairs. Still, in some instances, ASR models generate inaccurate transcriptions that misrecognize what the user actually spoke. This is often the case when user speaks personal named entity that is sparse in or non-existent in training data used to train the ASR model. As a result, a correct hypothesis for the personal named entity either has a low rank in a recognition lattice of possible speech recognition hypotheses or is missing entirely. As used herein, a personal named entity refers to any of a name of a personal contact, names in a media library (e.g., songs, artists, albums, movies, etc.), installed applications, as well as user-defined names (e.g., myLivingRoomStreamingDevice).

Existing techniques for improving recognition of a personal named entity is to apply biasing that typically includes boosting relevant speech recognition hypotheses that contain the personal named entity or creating a new candidate hypothesis that injects a personal named entity having close acoustic, graphemic, or embedding proximity to existing hypotheses. However, an often overlooked consideration is how to accurately score a contextual (user-specific or personal) candidate hypothesis for an utterance having a personal named entity relative to a non-contextual candidate hypothesis for the utterance that is devoid of any user-specific data, and thus missing the personal named entity. When a contextual hypothesis is scored in isolation of an existing non-contextual hypothesis, as is typically the case when applying the existing biasing techniques described above, ASR systems risk either over-triggering the contextual hypothesis that was not spoken or under-recalling the non-contextual candidate hypothesis even when spoken. For instance, consider a spoken utterance of "call Leonid" that an ASR model produces a non-contextual hypothesis of "call lee oh need". Accurately scoring a new hypothesis of "call Leonid" must consider whether "lee oh need" and "Leonid" are personal contacts, whether either "lee oh need" and "Leonid" is a generic entity likely to be spoken in utterances, a prior likelihood of the non-contextual hypothesis, and if other better non-contextual hypotheses are present.

In order to accurately rank a contextual hypothesis alongside a non-contextual hypothesis, the contextual hypothesis needs to be accurately scored. The ASR model that generated and scored the non-contextual hypothesis is not a good fit for scoring a contextual hypothesis since it already failed to recall, or assigned it a low score, during decoding. On the other hand, context-specific models such as biasing models that bias speech recognition results toward personal named entities do not have the ability to score and rank a speech recognition hypothesis that includes a personal named entity relative to generic entities which the ASR model is trained on.

Implementations herein are directed toward a speech recognizer module that includes a first (generic) model (M1) that does not contain any user-specific data and a second (personal) model (M2) computed and dynamically updated for a given user. In particular, a computing system receives audio data for an utterance spoken by a user and the computing system processes the audio data to generate a non-contextual candidate hypothesis for the utterance as output from the first model (M1) and a contextual candidate hypothesis for the utterance as output from the second model (M2). In some examples, first model (M1) is configured to generate multiple non-contextual hypotheses representing possible transcriptions for the utterance in a word lattice. As used herein, a non-contextual candidate hypothesis refers to a possible transcription for an utterance that is generated by the first model (M1) without incorporating any user-specific data or personal information associated with the given user. As such, the first model is effective for modeling recognition of generic entities spoken in utterances that are non-personal in nature, but is generally not suitable for recognizing personal named entities.

On the other hand, the second model (M2) is configured to generate the contextual candidate hypothesis including a personal named entity by leveraging personal context information relevant to the user. The context information may indicate user history related to a given personal named entity such as invocation frequency and usage patterns. More specifically, the second model (M2) corresponds to a user-specific model that assigns probabilities to possible personal named entities for a particular entity class based on the personal context information. As such, the second model is effective for modeling recognition of personal named entities spoken in utterances. Implementations herein are specifically directed toward combining the first and second models M1, M2 to determine likelihood scores for both the non-contextual hypothesis and the contextual hypothesis and selecting a transcription of the utterance by selecting the highest likelihood score of either one of the non-contextual hypothesis or the contextual candidate hypothesis. As used herein, a likelihood score indicates a probability that a corresponding candidate hypothesis is a correct transcription of an utterance spoken by a user.

FIG. 1 illustrates an example of a system 100 for automatic speech recognition (ASR) of an utterance 101 spoken by a user 10 using audio data 112 corresponding to the utterance (i.e., query) 101. The system 100 includes a client device 110, a computing system 120, and a network 118. The computing system 120 may be a distributed system (e.g., cloud computing environment) having scalable elastic resources. The resources include computing resources 122 (e.g., data processing hardware) and/or storage resources 124 (e.g., memory hardware). The network 118 can be wired, wireless, or a combination thereof, and may include private networks and/or public networks, such as the internet.

In some examples, the computing system 120 receives audio data 112 from the client device 110, and the computing system 120 processes the audio data 112 to generate, as output from a first recognizer model 130 one or more non-contextual candidate hypotheses 135 for the utterance 101 based on the audio data 112. In some additional examples, the client device 110 processes the audio data 112 entirely on-device to generate the one or more non-contextual candidate hypotheses 135 for the utterance 101 based on the audio data 112. Here, each non-contextual candidate hypothesis 135 corresponds to a candidate transcription for the utterance 101 that was generated without the use of any personal context information 126 and is represented by a respective sequence of hypothesized terms.

As described in greater detail below, a second recognizer model 140 (executing on the client device 110 or the computing system 120) leveraging personal context information 126 generates a contextual candidate hypothesis 145 for the utterance 101 that was either not included in the existing candidate hypotheses 135 or ranked very low among the existing candidate hypotheses in a lattice 200. Here, the contextual candidate hypothesis 145 corresponds to a candidate transcription for the same utterance 101 that was generated by incorporating personal context information 126. As such, the personal context information 126 leveraged by the second recognizer model 140 assists with the recognition of a personal named entity. Thereafter, a scoring model 150 scores the contextual candidate hypothesis 145 together with one of the non-contextual candidate hypotheses 13S such that the computing system 120 (or the user device 110) generates a transcription 175 for the utterance 101 by selecting a highest ranking hypothesis between the non-contextual candidate hypotheses 135 or the contextual candidate hypotheses 145 scored by the scoring model 150.

FIG. 1 shows operations (A) to (G) which illustrate a flow of data. As described herein, the computing system 120 performs operations (B) to (G). However, it is understood that the client device 110 may also perform operations (B) to (G) in addition to, or in lieu of, the computing system 120 performing the operations. In some examples, the client device 110 performs a first portion of the operations (e.g., operation (C) and the computing system 120 performs a second portion of the operations (e.g., operations (D) to (F)), or vice-versa.

The client device 110 includes data processing hardware 114 and memory hardware 116. The client device 110 may include one or more audio capture devices (e.g., microphone(s)) 103 for capturing and converting utterances 101 from the user 10 into the audio data 112 (e.g., electrical signals). In some examples, the microphone 103 is separate from the client device 110 and in communication with the client device 110 to provide the recorded utterance 101 to the client device 110. The client device 110 can be any computing device capable of communicating with the computing system 120 through the network 118. In lieu of spoken utterances 101, the user 10 may input textual utterances 101 via a keyboard 117, such as a virtual keyboard displayed in a graphical user interface of the client device 110 or a physical keyboard in communication with the client device 110. The client device 110 includes, but is not limited to, desktop computing devices and mobile computing devices, such as laptops, tablets, smart phones, smart speakers/displays, smart appliances, internet-of-things (IoT) devices, and wearable computing devices (e.g., headphones, headsets and/or watches).

In the example of FIG. 1, during stage (A), the user 10 speaks an utterance 101, and the microphone 103 of the client device 110 records the utterance 101. In this example, the utterance 101 includes the user 10 speaking "call Best Buy." The client device 110 transmits the audio data 112, corresponding to the utterance 101 recorded by the microphone 103, to the computing system 120 via the network 118. During stage (B), the computing system 120 processes the audio data 112 to generate, as output from a first recognition model 130, one or more non-contextual candidate hypotheses 135. Here, each candidate hypothesis 135 corresponds to a candidate transcription for the utterance 101 and is represented by a respective sequence of hypothesized terms. For example, the computing system 120 may execute a speech recognizer module 30 that includes the first recognition model 130 (e.g., an automated speech recognition (ASR) module) for producing a word lattice 200 indicating the non-contextual candidate hypotheses 135 that may be possible for the utterance 101 based on the audio data 112 without incorporating any personal context information 126. The first recognition model 130 may evaluate potential paths through the word lattice 200 to determine the non-contextual candidate hypotheses 135.

Figure 2A:
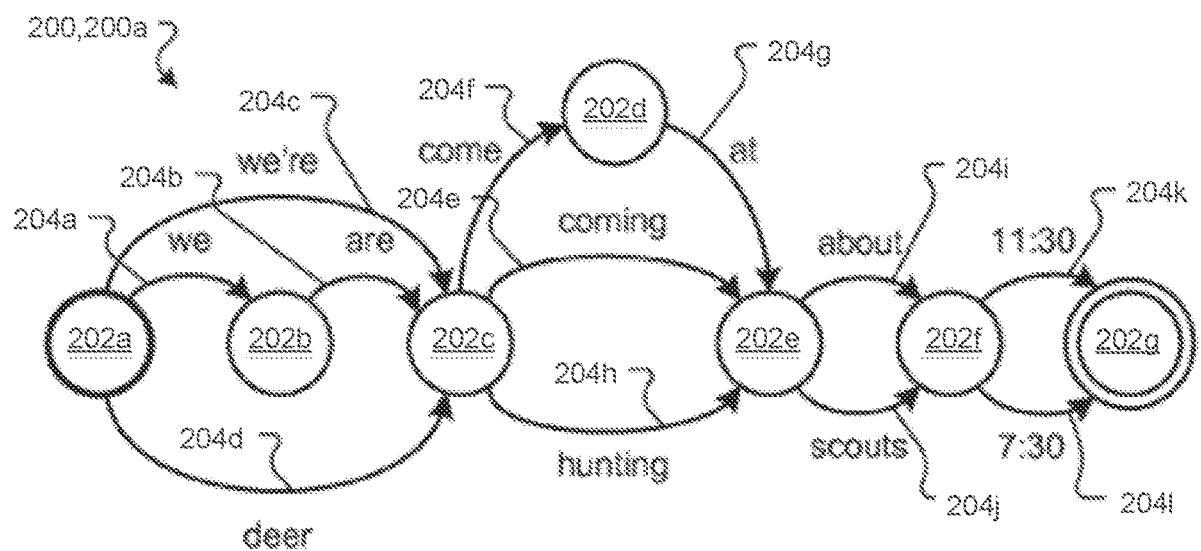
FIGS. 2A and 2B are schematic views of diagrams that illustrate examples of word lattices.

FIG. 2A is illustrates an example of a word lattice 200, 200a that may be provided by the first recognition model M1 130 of FIG. 1. The word lattice 200a represents multiple possible combinations of words that may form different non-contextual candidate hypotheses 135 for an utterance 101.

The word lattice 200a includes one or more nodes 202a-g that correspond to the possible boundaries between words. The word lattice 200a includes multiple edges 204a-l for the possible words in the candidate hypotheses that result from the word lattice 200a. In addition, each of the edges 204a-l can have one or more weights or probabilities of that edge being the correct edge from the corresponding node. The weights are determined by M1 130 and can be based on, for example, a confidence in the match between the speech data and the word for that edge and how well the word fits grammatically and/or lexically with other words in the word lattice 200a.

For example, initially, the most probable path (e.g., most probable non-contextual candidate hypothesis 135) through the word lattice 200a may include the edges 204c, 204e, 204l, 204k, which have the text "we're coming about 11.30." A second best path (e.g., second best non-contextual candidate hypothesis 135) through the word lattice 200a may include the edges 204d, 204h, 204j, 204l, which have the text "deer hunting scouts 7:30."

Each pair of nodes may have one or more paths corresponding to the alternate words in the various non-contextual candidate hypotheses 135. For example, the initial most probable path between the node pair beginning at node 202a and ending at the node 202c is the edge 204c "we're." This path has alternate paths that include the edges 204a, 204b "we are" and the edge 204d "deer."

Figure 2B:
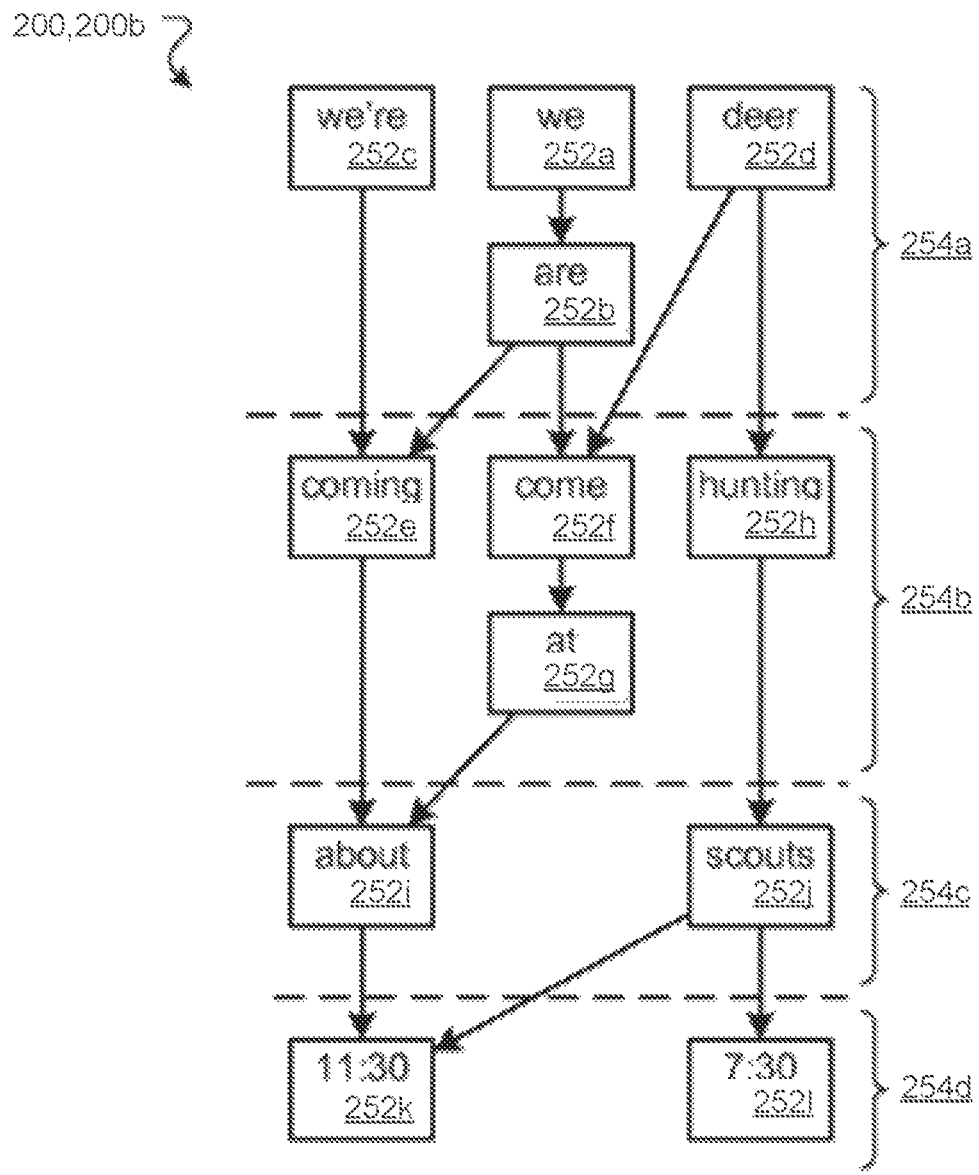

FIG. 2B is an example of a hierarchical word lattice 200, 200b that may be provided by the first recognition model 130 of FIG. 1. The word lattice 200b includes nodes 252a-l that represent words that make up the various non-contextual candidate hypotheses 135 for an utterance 101. The edges between the nodes 252a-l show that the possible candidate hypotheses 135 include: (1) the nodes 252c, 252e, 252i, 252k "we're coming about 11:30"; (2) the nodes 252a, 252b, 252e, 252i, 252k "we are coming about 11:30"; (3) the nodes 252a, 252b, 252f, 252g, 252i, 252k "we are come at about 11:30"; (4) the nodes 252d, 252f, 252g, 252i, 252k "deer come at about 11:30"; (5) the nodes 252d, 252h, 252j, 252k "deer hunting scouts 11:30"; and (6) the nodes 252d, 252h, 252j, "deer hunting scouts 7:30."

Again, the edges between the nodes 242a-l may have associated weights or probabilities based on the confidence in the speech recognition (e.g., candidate hypothesis) and the grammatical/lexical analysis of the resulting text. In this example, "we're coming about 11:30" may currently be the best hypothesis and "deer hunting scouts 7:30" may be the next best hypothesis. One or more divisions, 354a-d, can be made in the word lattice 200b that group a word and its alternates together. For example, the division 254a includes the word "we're" and the alternates "we are" and "deer." The division 252b includes the word "coming" and the alternates "come at" and "hunting." The division 254c includes the word "about" and the alternate "scouts" and the division 254d includes the word "11:30" and the alternate "7:30."

Referring back to FIG. 1, the first recognition model M1 130 may generate a first decoding result 132 modeling the non-contextual candidate hypotheses 135 from the word lattice 200 and corresponding likelihood scores 155 assigned to the non-contextual candidate hypotheses 135. Each likelihood score 155 indicates a probability that the candidate hypotheses 135 is correct (e.g., matches the utterance 101). In some implementations, the first recognition model M1 130 includes an end-to-end (E2E) speech recognition model configured to receive audio data 112 and generate the word lattice 200. In particular, the E2E speech recognition model processes the audio data 112 to generate the first decoding result 132 indicating the likelihood scores 155 for each of the multiple non-contextual candidate hypotheses 135 from the word lattice 200. In some examples, the first recognition model 130 includes a separate acoustic model, language model, and/or pronunciation model.

Notably, the first recognition model 130 corresponds to a general-purpose speech recognizer that is trained on general purpose data rendering the first recognition model M1 130 less accurate for recognizing speech in specialized domains that use specialized phrases (e.g., voice commands, medical jargon, legal jargon) and/or named entities (e.g., names of personal contacts, song/artist names, application names). The degradation in accuracy for recognizing speech in these specialized domains is due to sparsity in the general purpose data used to train the speech recognizer module, cross-lingual or rare words, emergence of new entities, and out of vocabulary terms that were not present in the general purpose data.

In some examples, the speech recognizer module 130 includes the acoustic model and/or the language model to generate the word lattice 200 or otherwise generate the multiple candidate hypotheses 135 for the utterance 101 based on the audio data 112. Here, the likelihood scores 155 of the multiple candidate hypotheses 135 may include a combination of an acoustic modeling score from the acoustic model and/or a prior likelihood score from the language model. Put another way, the likelihood scores 155 includes at least one of the acoustic modeling score output by the acoustic model and/or the prior likelihood score output by the language model.

As will be described in greater detail below with reference to FIG. 3, the first recognition model M1 130 may be trained as an aggregate devoid of any user-specific data to render the first recognition model 130 personalizable such that the first recognition model M1 130 is aware of a user context associated with the input utterance 101 but does not incorporate, or otherwise use, any user-specific data or personal information associated with the given user when generating the first decoding result 132. For instance, M1 130 may be trained over annotated utterances where personal entities are identified and replaced with a token 158. In some examples, different tokens 158 representing personal named entity classes are used to replace named entities that could belong to a particular named entity class. In the example shown, the first recognition model M1 130 also models/generates a personalized likelihood score 157 for a given non-contextual candidate hypothesis 13S having the recognized named entity (e.g., Best Buy) replaced with a corresponding token 158 (e.g., $CONTACT). Other tokens 158 representing other personal named entity classes such as, without limitation, applications (e.g., $APP), song names (e.g., $SONG), artist names (e.g., $ARTIST), and album names (e.g., $ALBUM) may be used. Accordingly, for the non-contextual candidate hypothesis 135 "call Best Buy", the first decoder result 132 also provides the personalized likelihood score 157 for "call $CONTACT". By modeling both the likelihood score 155 for the non-contextual hypothesis 13S and the personalized likelihood score 157 for the non-contextual hypothesis 135 having the named entity replaced with the token 158 representing the personal named entity class, the first recognition model 130 can be used to evaluate the relative merit of a personal (contextual) hypothesis 14S and the non-contextual (non-personal) candidate hypothesis 13S. By contrast, a conventional speech biasing approach would unilaterally boost "call $CONTACT" without consideration of the relative merit of non-contextual/non-personal alternatives in place of the token 158.

During stage (C), the computing system 120 generates, as output from a second recognition model M2 140, a contextual candidate hypothesis 145 that is either not included in the lattice 200 output by the first recognition model M1 130 or ranked very low among non-contextual candidate hypotheses in the lattice 200 during a first pass. While the first recognition model M1 130 is devoid of incorporating any user-specific data when generating the non-contextual candidate hypotheses 135, the second recognition model M2 140 is instead a personal recognition model tailored for a given user by incorporating personal context information 126 to assist with the recognition of a personal named entity. More specifically, the second recognition model M2 140 generates a second decoding result 142 that includes a probability distribution 147 over possible personal named entities 148 that belong to a particular personal named entity class denoted by the token 158. Here, the possible personal named entities 148 may include all the personal contacts of the user based on personal context information 126 that includes a contact list of the user. The personal context information 126 may further indicate invocation frequency and usage patterns of each personal named entity 148 in the probability distribution 147 associated with the particular personal named entity class. As such, the probability distribution 147 may assign a higher probability score to a personal named entity 148 that the user frequently accesses (and/or accesses at times associated with a current time when the utterance 101 is received) than if the personal named entity 148 were one that the user never or rarely speaks. Accordingly, the second recognition model 140 may adjust the score assigned to a contextual candidate hypothesis 145 having a personal named entity 148 based on how "contextually-relevant" the personal named entity 148 is. In the example shown, a highest personal named entity 148 "Beth Byer" in the probability distribution 147 includes a low-tier personal contact of the user who has not been accessed recently. The resulting score is thus lower than if Beth Byer were instead a high-tier personal contact that the user often accesses/calls.

In some examples, the second recognition model M2 140, like the first recognition model M1 130, includes an E2E speech recognition model. Here, the E2E speech recognition model is configured to receive the audio data 112 and the personal context information 126 and generate the second decoding result 142. In these examples, the first and second recognition models M1, M2 may process the audio data 112 and generate their corresponding first and second decoding results 132, 142 in parallel. Alternatively, the first recognition model M1 130 may generate the non-contextual candidate hypotheses 135 in the lattice 200 during a first pass, and subsequently, the second recognition model M2 140 may generate the contextual candidate hypothesis 145 during a second pass. In this scenario, the second recognition model M2 140 may also receive one or more of the non-contextual candidate hypotheses 135 in the lattice 200 that were generated during the first pass as a basis for generating the contextual candidate hypothesis 145 during the second pass. Accordingly, the first recognition model 130 may be a streaming E2E speech recognition model that generates streaming transcriptions and the second pass second recognition model 140 includes a more computationally intensive speech recognizer that may leverage the personal context information 126 to conceivably produce more accurate descriptions, albeit at increased latency. In some configurations, the first and second recognition models M1, M2 share one or more encoder layers such that an audio encoding of the audio data generated during the first pass may be used by the second recognition model M2 140 during the second pass so that the M2 does not have to encode the audio data 112 again.

In other examples, the second recognition model M2 140 corresponds to a correction model that generates the contextual candidate hypothesis 145 after the first recognition model M1 130 generates the non-contextual candidate hypotheses 135 during a first pass. Here, the correction model may correspond to a second pass language model that uses the personal context information 126 to generate the contextual candidate hypothesis 145 as a new hypotheses relevant to the user context that was entirely missing from the lattice 200 or to rescore existing hypotheses in the lattice 200 based on the user context. In some examples, the language model associated with the second recognition model M2 140 includes a personal/user-specific language model trained to recognize named entities 148 personal to the user 10 based on the personal context information 126. In these examples, the personal/user-specific language model may include an auxiliary language model external to the first recognition model M1 130. As such, the second recognition model M2 may only receive the lattice 200 as input without audio data 110 and generate the contextual candidate hypothesis 145 that is acoustically similar to the non-contextual candidate hypotheses 135. Additionally or alternatively, the second recognition model 140 may include a biasing model that injects personal named entities that are acoustically similar to generic/generalized terms in the lattice 200 and/or boosts scores 155 of hypotheses in the lattice that include personal named entities relevant to the personal context information 126.

An important aspect of the speech recognition model 130 that combines the non-personal but personalizable first recognition model 130 and the personal second recognition model 140 is the ability safeguard potentially sensitive, user-specific data (e.g., personal context information 126) incorporated into the second recognition model 140. For example, the personal context information 126 may be stored on the memory hardware 116 of the user device 110 and the second recognition model 140 may execute on the data processing hardware 114 of the user device 110 such that no user-specific data is revealed to the computing system 120 (e.g., remote server/distributed system). In some scenarios, second recognition model 140 executes on the user device 110 to compute/generate situational probabilities that are reduced into a simple weighted grammar and sent to the computing device 120 on demand. In these scenarios, the values of the probability distribution 147 over possible personal named entities 148 may be sent over the network to the computing device 120 without having to share any of the user-specific data/logic used for computing these values.

The first recognition model 130 may run on the user device 110 or the computing system 120. As the first recognition model 130 is non-personal and intentionally built without using any user-specific data, the first recognition model 130 can execute on the computing system 120 without revealing information/data personal to the user.

The personal context information 126 may include personal named entities 148 specific to the user 10 that spoke the utterance 101 such as, without limitation, a list of the user's contacts, names of items (song, artist, album, movie names) in the user's media library, names of nearby locations, names of installed applications, and user-defined entity names. The personal context information 126 may further indicate user history related these personal named entities such as invocation frequency and usage patterns. For instance, the user's media library may have music files by both the artists Phish and Hootie and the Blowfish, but may have only played a song by Hootie and the Blowfish one time five years ago whereas the user plays songs by Phish on an almost daily basis. As a result, the personal context information 126 would permit the second recognition model M2 140 to appropriately assign a higher likelihood/probability for a candidate hypothesis of "Play Harpua by Phish" than for "Play Hootie and the Blowfish" User history indicated by the personal context information 126 may further include prior queries, learned correlations, corrections to previously misrecognized transcriptions, etc.

The personal context information 126 may be stored on the memory hardware 114 of the user device 110 and/or on the memory hardware 124 of the computing system 120. The information in these different contextual data sets will change from time to time, such as when the user adds or deletes contacts, when the user's media library changes, when the user adds or deletes installed applications, when the user changes location, and so on.

With continued reference to FIG. 1, the scoring model 150 receives the first decoder result 132 generated by the first recognition model 130 and the second decoder result 142 generated by the second recognition model 140. In some examples, the scoring model 150 receives the first decoder result 132 associated with the I-best non-contextual hypothesis 130 from the lattice 200. The scoring model 150 is configured to score the contextual candidate hypothesis 145 together with the non-contextual hypothesis 135 so that both personal named entities may be considered in relation to non-personal alternatives for selecting the best candidate hypothesis 135, 145 as the resulting transcription 175 for the utterance 101. When scoring the contextual candidate hypothesis 145 and the non-contextual candidate hypothesis 135, the scoring model 150 uses both the likelihood score 15S, $P_{M1}$(call Best Buy), and the personalized likelihood score 157, $P_{M1}$(call $CONTACT), modeled by the first recognition model M1 130 for the non-contextual candidate hypothesis 135, as well as the probability distribution 147 over possible personal named entities 148, $P_{M2}$(Beth Byer|$CONTACT), modeled by the second recognition model M2 140.

As will become apparent, scoring the contextual candidate hypothesis 145 output by M2 140 relative to the non-contextual candidate hypothesis 135 output by M1 130 prevents over-triggering the contextual candidate hypothesis 145 in scenarios it was not spoken, while at the same time, prevents under-recalling the non-contextual candidate hypothesis 135 in scenarios it was spoken. Continuing with the example where "call Best Buy" includes the non-contextual candidate hypothesis 135 having the generic named entity "Best Buy" and "call Beth Byer" includes the contextual candidate hypothesis 145 having the personalized named entity injected from a list of personal contacts of the user, the personalization of the first model M1 and the incorporation of the personal contextual information 126 leveraged by the second model M2 allows the scoring model 300 to consider whether Beth Byer is a personal contact of the user, whether either of Best Buy or Beth Byer is frequently called by the user, whether either of Beth Byer or Best Buy is a common generic entity likely to be spoken, acoustic fit to the audio data 112, and whether other, better (e.g., higher likelihood score 155) are available in the lattice 200

The scoring model 150 may score the contextual candidate hypothesis 145 output by M2 140 relative to the non-contextual candidate hypothesis 135 as follows.

$$P_{M1}(h \text{ with entity}_g) = P_{M1}(h \text{ with \$entityclass}) \times P_{M2}(\text{entity}_p | \$entityclass) \quad (1)$$

where $P_{M1}$(h with entity$_g$) denotes the likelihood score 155 assigned to the non-contextual candidate hypothesis 135 (e.g., call Best Buy) modeled by the first recognition model M1 130, $P_{M1}$(h with $entityclass) denotes the personalized likelihood score 157 for the non-contextual candidate hypothesis 135 having the generic named entity (e.g., Best Buy) replaced with a corresponding token (e.g., $CONTACT) 158 associated with a personalized named entity class (e.g., personal contacts), and $P_{M2}$(entity$_p$|$entityclass) denotes the probability distribution 147 over possible personal named entities 148 that belong to a particular personal named entity class denoted by the token 158. The term entity$_p$ may represent probability values summing to a value of 1.0 for each personal named entity relevant to the given personal named entity class. The resulting value for $P_{M2}$ (entity$_p$|$entityclass) may simply include the value for the personal named entity ranked highest in the probability distribution 147.

Continuing with the example above, while the personal contextual information 126 may indicate that "Beth Byer" is indeed one of the user's personal contacts, the context information 126 may further reveals that "Beth Byer" is a lower-tier personal contact who is rarely, or even never, called by the user, rendering the contextual (personal) candidate hypothesis 145 relatively weak compared to the strong non-contextual (non-personal) candidate hypothesis 135 "call Best Buy". Notably, the existing and new candidate hypotheses are phonetically close to one another may indicate that while Beth Byer is a contact in the user's list of personal contacts, Beth Byer is a low-tier personal contact that the user rarely calls. As a result, applying Equation 1 to score the contextual candidate hypothesis 145 output by M2 140 relative to the non-contextual candidate hypothesis 135 would result in Pan (call Best Buy)>$P_{M1}$(call $CONTACTS) *$P_{M2}$(Beth Byer|$CONTACTS), whereby the non-contextual candidate hypothesis 135 would not be replaced and would be appropriately selected as the transcription 175 of the utterance 101.

In another example where the user 10 spoke an utterance 101 of "call Leonid" (e.g., a personal contact of the user), the first model M1 130 may generate a non-contextual candidate hypothesis 135 "call lee oh need" and the second model M2 140 may generate a contextual candidate hypothesis 145 "call Leonid". While the two hypothesis 135, 145 are phonetically close to one another, the likelihood score 155 assigned to the non-contextual hypothesis 135 may indicate that the non-conextual candidate hypothesis 135 is nonsensical and unlikely to be spoken, while the probability distribution 147 over possible personal named entities 148 belonging to the personal contacts class may include a high probability for "Leonid" based on the personal contextual information 126 indicating "Leonid" is one of the user's personal contacts that the user calls on a regular basis. As a result, applying Equation 1 to score the contextual candidate hypothesis 145 output by M2 140 relative to the non-contextual candidate hypothesis 135 would result in Pau (call lee oh need)<Pour (call $CONTACTS)*P$_{M2}$ (Leonid-|$CONTACTS), whereby the contextual candidate hypothesis 145 would be appropriately selected as the transcription 175 of the utterance 101.

The scoring model 150 may evaluate and score the contextual candidate hypothesis 145 against a single non-contextual candidate hypothesis 135 and its corresponding likelihood score 155. The single non-contextual candidate hypothesis 135 may be cherry-picked for better scoring accuracy based on, for example, a high acoustic proximity to the new candidate hypothesis 145 and/or familiarity with similar hypothesis for use as reference points. The single non-contextual candidate hypothesis 135 may be selected as a 1-best hypothesis 135 in the lattice. Alternatively, the scoring model 150 may evaluate and score the contextual candidate hypothesis 145 against multiple non-contextual candidate hypotheses 135 (or even all hypothesis in the original lattice 200) and their corresponding likelihood scores 155 to provide more accurate scoring at the cost increased computation burden (adding to increased latency and increased memory requirements).

With continued reference to FIG. 1, during stage (F), a re-ranker 160 receives a scoring output 152 from the scoring model 150 that scores the contextual candidate hypothesis 145 against a non-contextual candidate hypothesis 13S and its corresponding likelihood score 155. The re-ranker 160 is configured to output a re-ranked result 165 that includes the rankings the non-contextual candidate hypothesis 135 and the contextual candidate hypothesis 145 based on the scoring output. In the example shown, the re-ranked result 16S includes the non-contextual candidate hypothesis 135 with a score of 0.9 as the most likely correct transcription 175.

At stage (G), the computing system 120 is configured to generate a transcription 175 of the utterance 101 spoken by the user 10 by selecting the highest ranking candidate in the re-ranked result 165. In the example shown, the computing system 120 selects the non-conextual candidate hypothesis 135 "call Best Buy" because it has the highest score of 0.9. The computing system 120 may transmit the transcription 175, via the network 118, to the client device 110 to provide the transcription 175 to the user 10. In some implementations, the client device 110 performs all of stages (A)-(G) on device without the need to connect to the computing system 120 via the network 118.

While the above examples depict scoring contextual candidate hypotheses relative to non-contextual candidate hypotheses for audio-based speech inputs, aspects of the present disclosure are equally applicable for scoring contextual candidate hypotheses relative to non-contextual candidate hypotheses for non-speech inputs. For instance, a non-speech input 113 may include a user input indication indicating selection of one or more characters of the keyboard 117 (e.g., virtual or physical keyboard) in communication with the data processing hardware 114 of the client device 110. In this example, the speech recognizer module 130 may be replaced by a keyboard detection module configured to generate a lattice 200 of non-contextual candidate hypotheses 135 for the non-speech input 113. The models M1 and M1 may function similarly to the examples above by generating non-contextual and contextual candidate hypothesis 135, 145 for the non-speech input 113. The scoring model 150 may then score the contextual candidate hypothesis relative to the non-contextual candidate hypotheses, thereby providing the ability to rank a non-speech recognition hypothesis that is personal/user-specific relative to non-personal hypothesis that includes generic terms which the keyboard detection module may not have been trained on.

Figure 3:
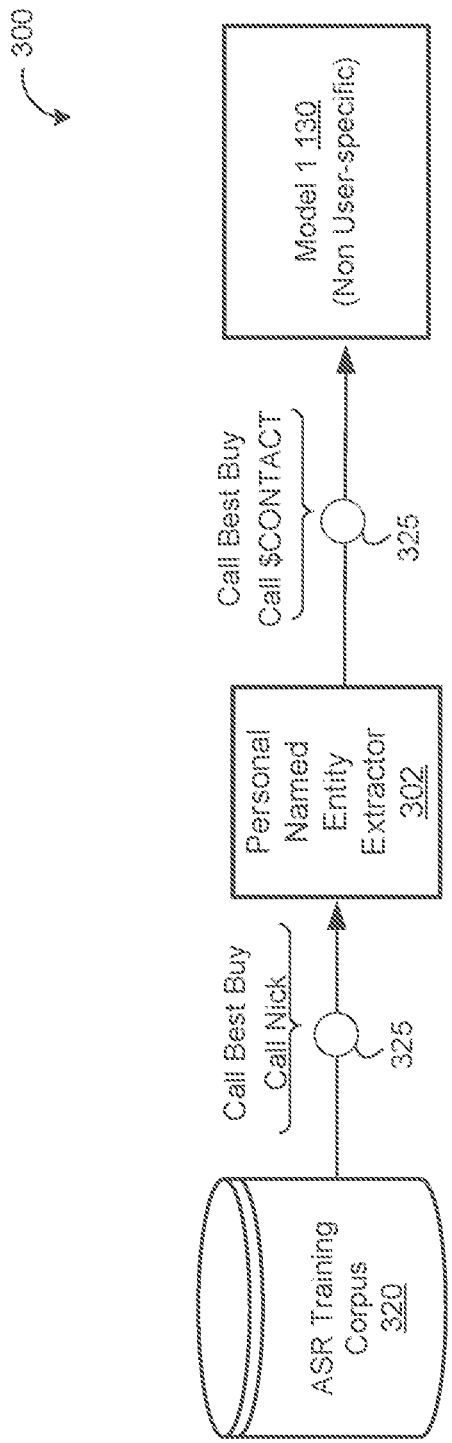
FIG. 3 is a schematic view depicting a training process for training the first speech recognition model used by the system of FIG. 1.

Referring now to FIG. 3, in some implementations, an example training process 300 that trains the first recognition model M1 130 as an aggregate devoid of any user-specific data to personalize the first recognition model M1 130. Specifically, the training process 300 may train the first model M1 130 on an ASR training corpus 320 that includes a corpus of ground-truth transcriptions 325. In some examples, a personal named entity extractor 302 may replace an identified personal named entity a transcription 325 with a corresponding token associated with a personal named entity class that the identified personal named entity belongs to. For instance, the extractor 302 may identify "Nick" in the transcription "Call Nick" as personal named entity that belongs to a personal contacts class and replace "Nick" with the corresponding token "$CONTACT". The extractor 302 may identify personal named entities through techniques such as parsing and/or explicit labels provided in the transcriptions 325.

Optionally, the training process 300 may additionally train the first model M1 130 over generic transcriptions that only include generic named entities. Here, the extractor 302 may determine when a given transcription 325 omits a personal named entity and therefore does not replace any terms in the transcription 325 with a token. In this scenario, training process 300 also trains the first model M1 130 on generic transcriptions 325 to teach the model M1 130 to evaluate the relative merit between personal hypothesis that include personal named entities and non-personal hypotheses that include only generic terms. For instance, the extractor 302 may determine that "Best Buy" is a generic entity in the transcription "Call Best Buy" and therefore permit the transcription 325 to train the model M1 130 without replacing any terms with tokens.

A software application (i.e., a software resource) may refer to computer software that causes a computing device to perform a task. In some examples, a software application may be referred to as an "application," an "app," or a "program" Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
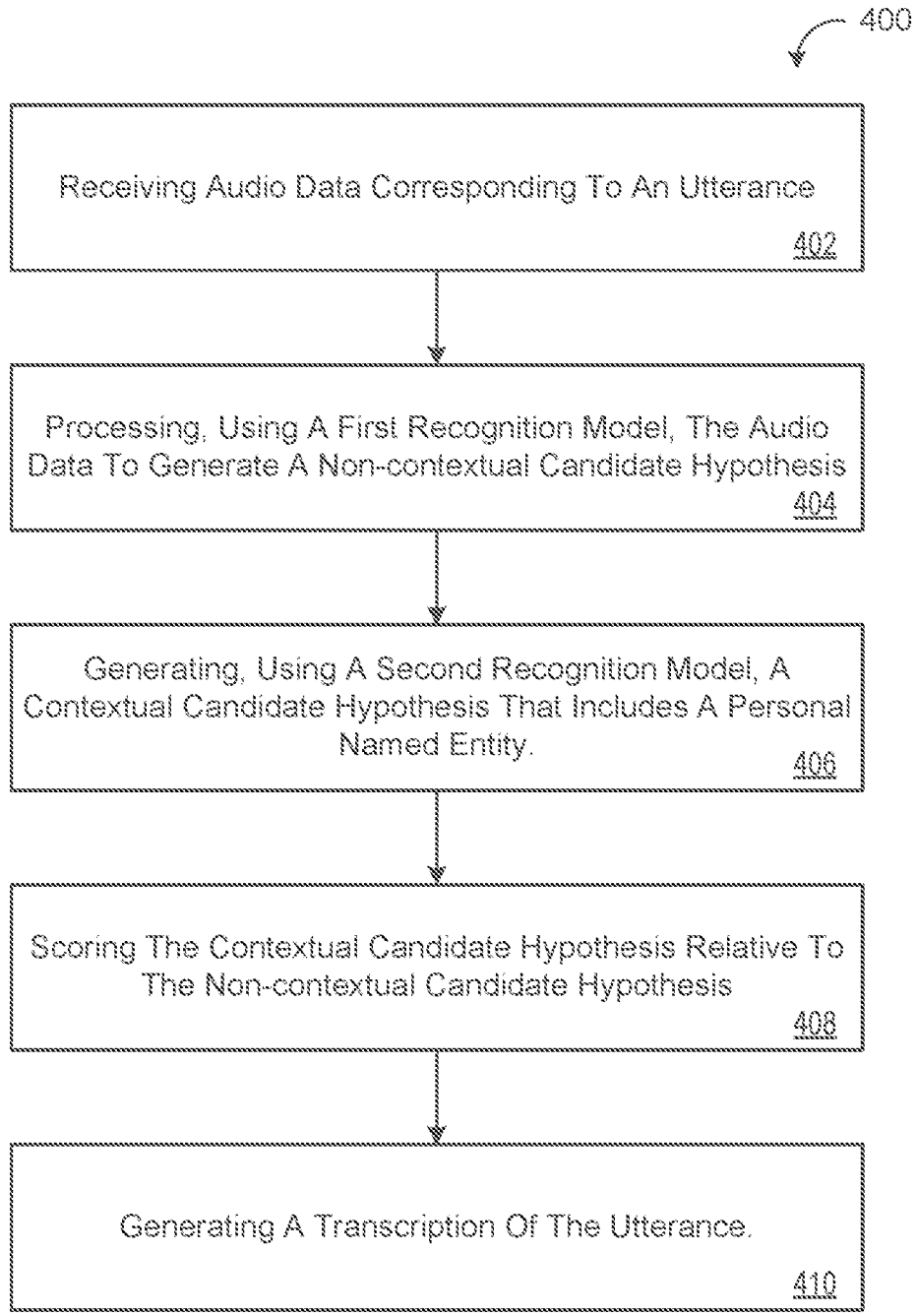
FIG. 4 is a flowchart of an example arrangement of operations for a method of scoring a first candidate hypothesis generated for an utterance by a first speech recognition model and a second candidate hypothesis generated for the same utterance by a second speech recognition model.

FIG. 4 is a flowchart of an example arrangement of operations for a method 400 of scoring a contextual candidate hypothesis 145 relative to a non-contextual candidate hypothesis. The data processing hardware 122 (FIG. 1) may execute instructions stored on the memory hardware 124 (FIG. 1) to perform the example arrangement of operations for the method 400. At operation 402, the method 400 includes receiving audio data 112 corresponding to an utterance 101 spoken by a user 10. At operation 404, the method 400 includes processing, using a first recognition model 130, the audio data 112 to generate a non-contextual candidate hypothesis 135 as output from the first recognition model 130. Here, the non-contextual candidate hypothesis 135 corresponds to a candidate transcription of the utterance and has a corresponding likelihood score 155 assigned by the first recognition model 130 to the non-contextual candidate hypothesis 135.

At operation 406, the method 400 includes generating, using a second recognition model 140 configured to receive personal context information 126, a contextual candidate hypothesis 145 that includes a personal named entity. Here, the contextual candidate hypothesis corresponds to another candidate transcription for the utterance.

At operation 408, the method 400 includes scoring, based on the personal context information 126 and the corresponding likelihood score 155 assigned to the non-contextual candidate hypothesis 135, the contextual candidate hypothesis 145 relative to the non-contextual candidate hypotheses 135. Based on the scoring of the contextual candidate hypothesis relative to the non-contextual candidate hypothesis, the method 400 also includes, at operation 410, generating a transcription 175 of the utterance 101 spoken by the user 10 by selecting one of the contextual candidate hypothesis 145 or the non-contextual candidate hypothesis 135.

Figure 5:
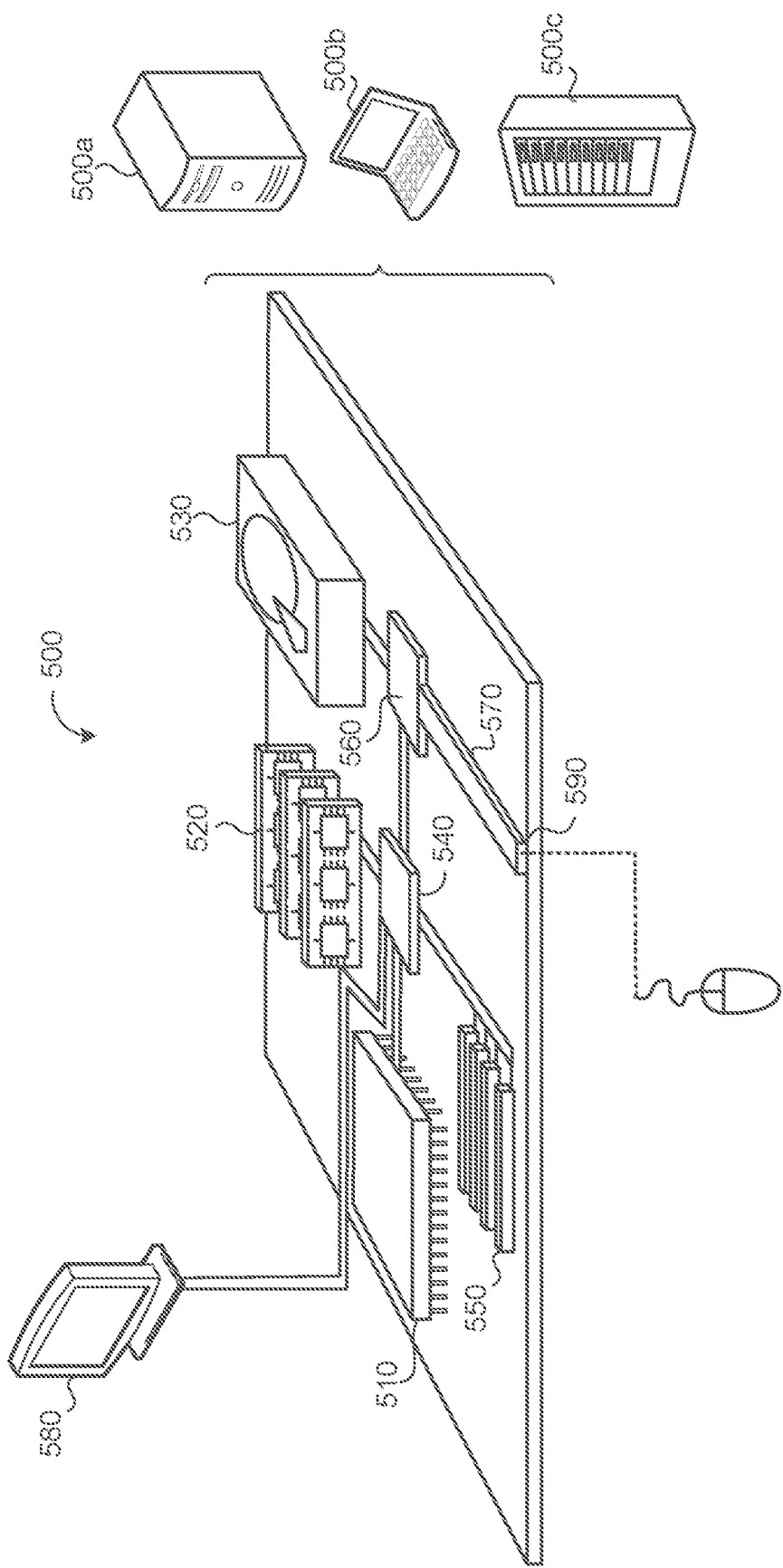
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   receiving audio data corresponding to an utterance spoken by a user;
   processing the audio data, using a first recognition model trained by a training process as an aggregate devoid of any user-specific data, to generate a non-contextual candidate hypothesis as output from the first recognition model, the non-contextual candidate hypothesis corresponding to a candidate transcription of the utterance and having a corresponding likelihood score assigned by the first recognition model to the non-contextual candidate hypothesis, wherein the first recognition model is devoid of incorporating any user-specific data when generating the non-contextual candidate hypothesis as output from the first recognition model;
   separately processing the audio data, using a second recognition model configured to receive personal contextual information, to generate a contextual candidate hypothesis as output from the second recognition model that includes a personal named entity, the contextual candidate hypothesis corresponding to another candidate transcription for the utterance;
   scoring, based on the personal contextual information and the corresponding likelihood score assigned to the non-contextual candidate hypothesis, the contextual candidate hypothesis relative to the non-contextual candidate hypotheses; and
   based on the scoring of the contextual candidate hypothesis relative to the non-contextual candidate hypothesis, generating a transcription of the utterance spoken by the user by selecting one of the contextual candidate hypothesis or the non-contextual candidate hypothesis,
   wherein the training process trains the first recognition model by:
      receiving a training corpus comprising a plurality of utterances, each utterance of the plurality of utterances paired with a corresponding ground-truth transcription;
      for each corresponding ground-truth transcription in the training corpus of ground-truth transcriptions:
         determining whether a personal named entity is identified in the corresponding ground-truth transcription; and
         when the personal named entity is identified in the corresponding ground-truth transcription, replacing the personal named entity with an entity class token; and
      training the first recognition model by adjusting coefficients of the first recognition model based on the plurality of utterances and the corresponding ground-truth transcriptions that include personal named entities replaced by the entity class tokens.

2. The computer-implemented method of claim 1, wherein the first recognition model processes the audio data to generate the non-contextual candidate hypothesis without incorporating any of the personal contextual information associated with the user.

3. The computer-implemented method of claim 1, wherein the first recognition model comprises an end-to-end speech recognition model configured to generate the corresponding likelihood score for the non-contextual candidate hypothesis.

4. The computer-implemented method of claim 1, wherein:
the second recognition model comprises an end-to-end speech recognition model configured to generate the contextual candidate hypothesis; and
wherein generating the contextual candidate hypothesis that includes the personal named entity comprises processing, using the end-to-end speech recognition model, the audio data to generate the contextual candidate hypothesis based on the personal context information.

5. The computer-implemented method of claim 4, wherein the end-to-end speech recognition model is configured to generate the contextual candidate hypothesis after the non-contextual candidate hypothesis is generated as output from the first recognition model.

6. The computer-implemented method of claim 4, wherein the end-to-end speech recognition model is configured to generate the contextual candidate hypothesis in parallel with the processing of the audio data to generate the non-contextual candidate hypothesis as output from first recognition model.

7. The computer-implemented method of claim 1, wherein the second recognition model comprises a language model.

8. The computer-implemented method of claim 1, wherein the personal context information associated with the user comprises personal named entities specific to the user, the personal named entities comprising at least one of:
contact names in a personal contact list of the user;
names in in a media library associated with the user;
names of installed applications;
names of nearby locations; or
user-defined entity names.

9. The computer-implemented method of claim 1, wherein the personal contextual information associated with the user further indicates a user history related to the personal named entity specific to the user.

10. A system comprising:
data processing hardware; and
memory hardware in communication with the data processing hardware and storing instructions that, when executed on the data processing hardware, cause the data processing hardware to perform operations comprising:
receiving audio data corresponding to an utterance spoken by a user;
processing the audio data, using a first recognition model trained by a training process as an aggregate devoid of any user-specific data, to generate a non-contextual candidate hypothesis as output from the first recognition model, the non-contextual candidate hypothesis corresponding to a candidate transcription of the utterance and having a corresponding likelihood score assigned by the first recognition model to the non-contextual candidate hypothesis, wherein the first recognition model is devoid of incorporating any user-specific data when generating the non-contextual candidate hypothesis as output from the first recognition model;
separately processing the audio data, using a second recognition model configured to receive personal contextual information, to generate a contextual candidate hypothesis as output from the second recognition model that includes a personal named entity, the contextual candidate hypothesis corresponding to another candidate transcription for the utterance;
scoring, based on the personal context information and the corresponding likelihood score assigned to the non-contextual candidate hypothesis, the contextual candidate hypothesis relative to the non-contextual candidate hypotheses; and
based on the scoring of the contextual candidate hypothesis relative to the non-contextual candidate hypothesis, generating a transcription of the utterance spoken by the user by selecting one of the contextual candidate hypothesis or the non-contextual candidate hypothesis,
wherein the training process trains the first recognition model by:
receiving a training corpus comprising a plurality of utterances, each utterance of the plurality of utterances paired with a corresponding ground-truth transcription;
for each corresponding ground-truth transcription in the training corpus of ground-truth transcriptions:
determining whether a personal named entity is identified in the corresponding ground-truth transcription; and
when the personal named entity is identified in the corresponding ground-truth transcription, replacing the personal named entity with an entity class token; and
training the first recognition model by adjusting coefficients of the first recognition model based on the plurality of utterances and the corresponding ground-truth transcriptions that include personal named entities replaced by the entity class tokens.

11. The system of claim 10, wherein the first recognition model processes the audio data to generate the non-contextual candidate hypothesis without incorporating any of the personal contextual information associated with the user.

12. The system of claim 10, wherein the first recognition model comprises an end-to-end speech recognition model configured to generate the corresponding likelihood score for the non-contextual candidate hypothesis.

13. The system of claim 10, wherein:
the second recognition model comprises an end-to-end speech recognition model configured to generate the contextual candidate hypothesis; and
wherein generating the contextual candidate hypothesis that includes the personal named entity comprises processing, using the end-to-end speech recognition model, the audio data to generate the contextual candidate hypothesis based on the personal context information.

14. The system of claim 13, wherein the end-to-end speech recognition model is configured to generate the contextual candidate hypothesis after the non-contextual candidate hypothesis is generated as output from the first recognition model.

15. The system of claim 13, wherein the end-to-end speech recognition model is configured to generate the contextual candidate hypothesis in parallel with the processing of the audio data to generate the non-contextual candidate hypothesis as output from first recognition model.

16. The system of claim 10, wherein the second recognition model comprises a language model.

17. The system of claim 10, wherein the personal context information associated with the user comprises personal named entities specific to the user, the personal named entities comprising at least one of:
- contact names in a personal contact list of the user;
- names in in a media library associated with the user;
- names of installed applications;
- names of nearby locations; or
- user-defined entity names.

18. The system of claim 10, wherein the personal contextual information associated with the user further indicates a user history related to the personal named entity specific to the user.

* * * * *